United States Patent [11] 3,628,862

[72] Inventor Robert L. Stephenson
 Warren, Mich.
[21] Appl. No. 852,779
[22] Filed Aug. 25, 1969
[45] Patented Dec. 21, 1971
[73] Assignee Allied Chemical Corporation
 New York, N.Y.

[54] POWER ACTUATED REARVIEW MIRROR
 6 Claims, 7 Drawing Figs.
[52] U.S. Cl................................................. 350/289,
 248/487
[51] Int. Cl..................................................... G02b 5/08
[50] Field of Search............................................. 350/6, 7,
 285, 289, 304–306; 240/61.13; 178/7.6; 250/203;
 248/485, 487

[56] References Cited
 UNITED STATES PATENTS
2,966,591 12/1960 McCartney................... 350/7
3,075,073 1/1963 Hildebrecht.................. 240/61.13
3,459,470 8/1969 Hahn............................. 350/289

Primary Examiner—David Schonberg
Assistant Examiner—Michael J. Tokar
Attorneys—Jonathan Plaut and Marian Bressler ABSTRACT: A power actuated outside rearview mirror assembly, particularly for a motor vehicle, comprising a mirror housing in which is mounted a stationary yoke member which supports a motor having an output shaft to which is fixed a worm gear adapted to mesh with a sector gear formed on the rear of a second yoke member, pivotally supported within the stationary yoke member and attached to the rear of a mirror for angular movement of the mirror in one direction. The second yoke member supports another motor having an output shaft to which is fixed a worm gear adapted to mesh with another sector gear disposed within the second yoke member which is similarly connected to the rear of the mirror for angular movement of the mirror in another direction. The last named motor extends through an elongated opening in the stationary yoke member for relative movement therein upon adjustment of the mirror in a first angular direction.

INVENTOR
ROBERT L. STEPHENSON
BY
Barnard, McGlynn & Reising
Attorneys

POWER ACTUATED REARVIEW MIRROR

BACKGROUND OF THE INVENTION

1. Field of the Invention

The present invention refers to rearview mirrors for motor vehicles, particularly to a power actuated outside rearview mirror which is adjustable universally in angular directions providing separate horizontal and vertical angular motions.

2. Description of the Prior Art

Power controlled outside rearview mirrors for motor vehicles which employ a remotely controllable power device, such as an electric motor or solenoid directly attached to the swivel mechanism of the outside mirror or mirrors are known in the art. The power device is operable from within the vehicle by appropriate actuating switches or the like. Generally these mechanisms are employed for remote power control of a rearview mirror or a pair of rearview mirrors which are pivotal around a vertical axis only, such as are frequently in use on trucks, buses, tractor-trailers and the like vehicles. These mirrors are usually not tiltable around a horizontal axis.

In outside rear view mirrors and similarly related devices which are adapted to be pivoted about a pair of noncolinear axes, such as a horizontal and a vertical axis, the actuation of these mirrors by remotely controlled power means is usually more difficult because of the requirement of pivoting the mirror around axes at right angles to each other, which requires the employment of two separate power operated drive mechanisms, which must be operable independently of each other. Since these drive mechanisms are usually incorporated within the outside mirror structure itself, obvious construction difficulties have to be met to maintain the overall mirror structure within reasonable dimensions and comparable weight and cost. Although comparatively small power operators, such as electric motors, are available for installation in relatively small housing structures, such as mirror housings for outside rearview mirrors, obvious difficulties have to be overcome to install these small motors and their associated drive mechanism in such fashion as to be effectively operable to tilt the mirror around a pair of intersecting axes.

Known devices of this type employ a pair of power actuators independently operable for repositioning of the mirror around a horizontal and vertical axis. This is accomplished in the known devices by connecting the power outputs of the respective directional motors to a reduction gear drive mechanism which, by itself, is costly and difficult to install.

A further problem associated with these known devices is the mounting of the motors and associated drive mechanisms within the mirror housing structure in such fashion that they will be protected against shock loads due to the movement of the vehicle over the road, so as to prevent damage to the device.

SUMMARY OF THE INVENTION

The present invention provides an improved power operated outside rearview mirror structure adapted to be selectively rotated around a pair of intersecting axes.

The mirror structure comprises a housing in which the mirror proper is contained for angular movement about a vertical and a horizontal axis. To this end, the mirror is pivotally attached by means of a horizontal pivot pin retained within brackets attached to the mirror, which in turn are pivoted within a pivotal yoke member. The pivotal yoke member is pivoted within a stationary yoke member secured in the mirror housing. One of the mirror brackets is provided with a gear sector adapted to be engaged by a worm gear which is secured to the output shaft of a first motor, which is securely attached to the pivotal yoke member and which extends through an elongated aperture in the stationary yoke member. The first motor is adapted, upon actuation, to swing the mirror brackets around a horizontal axis. The pivotal yoke member is likewise provided with a gear sector adapted to be engaged by a worm gear secured to the output shaft of a second motor, which is securely attached to the stationary yoke member. The second motor is adapted, upon actuation, to swing the pivotal yoke member around a vertical axis together with the first motor which is attached to the pivotal yoke member. Both motors are suitably connected to a control device, such as a switch, located remote from the mirror assembly and within the vehicle for easy manipulation by the driver or other occupant of the vehicle.

Other obvious novel features and advantages will become apparent or be particularly pointed out in the following detailed description of several modifications of a preferred embodiment of the present invention.

BRIEF DESCRIPTION OF THE DRAWINGS

The accompanying drawings illustrate schematically the several modifications of the preferred embodiment of the present novel device as referred to in the hereafter following detailed description and in which.

DESCRIPTION OF THE PREFERRED EMBODIMENT

Figure 1:
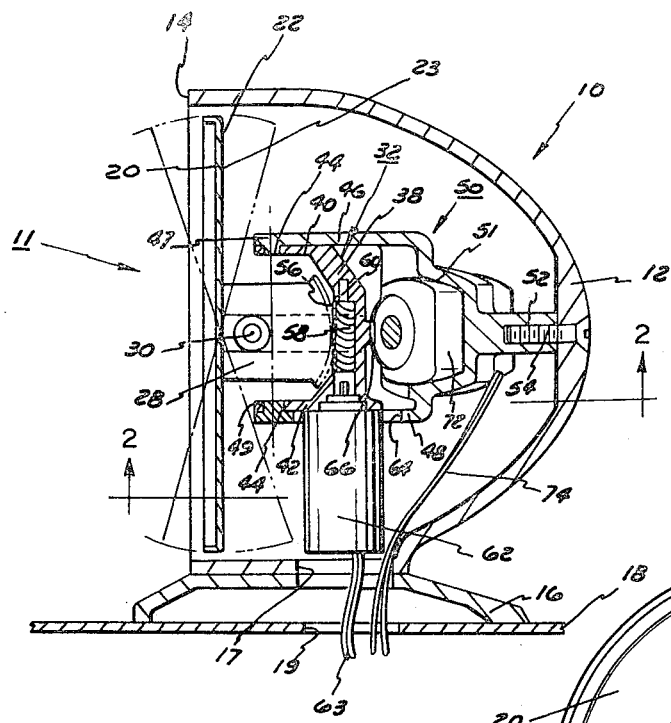
FIG. 1 is a longitudinal vertical cross section through an outside rearview mirror housing assembly embodying an exemplary structure of the present novel device.
Figure 3:
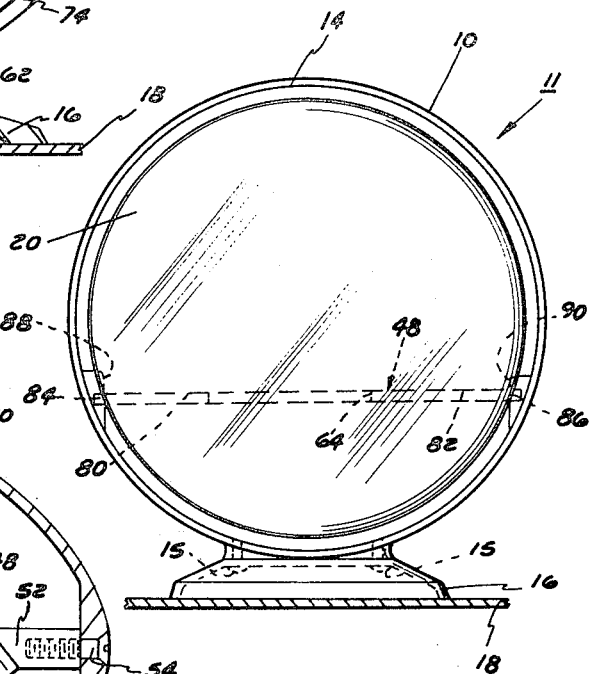
FIG. 3 is an outside front view of the rearview mirror housing assembly shown in FIG. 1.
Figure 2:
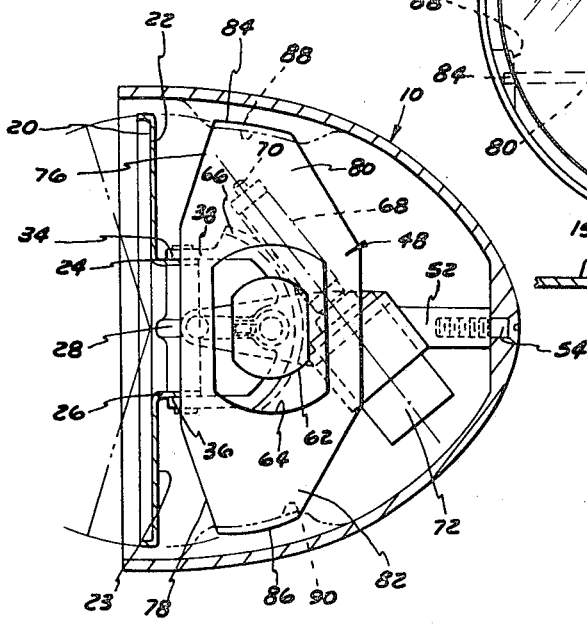
FIG. 2 is a longitudinal horizontal cross section of the rearview mirror housing assembly shown in FIG. 1 as seen along line 2—2 thereof.

With reference now to FIGS. 1 to 3, the present novel rearview mirror assembly comprises a mirror housing 10 of generally shell or bowlike shape having a closed rear end 12 and an open front end 14.

The housing 10 is suitably secured such as by fasteners 15 (FIG. 3) to a base 16 which serves as a support to attach the mirror housing to the outer surface of a portion of a panel 18, which, for example, may comprise an outside door or fender panel of a motor vehicle. As is conventional, the mirror housing 10 is attached to the panel 18 in such fashion that the open front end 14 of the housing faces towards the driver's compartment of the vehicle.

Figure 5:
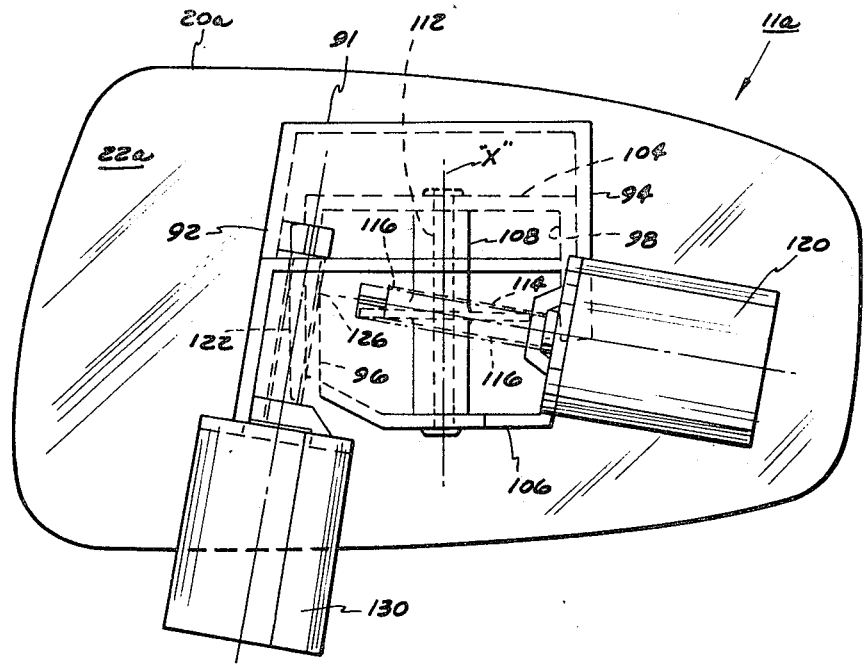
FIG. 5 is a rearview of the mirror drive mechanism shown in FIG. 4.

Still referring to FIGS. 1–3 the mirror housing 10 is illustrated as being of circular cross section to accommodate a circular mirror 20, however, it is apparent that the housing may have any other cross section than circular to accommodate mirrors of noncircular shape, such as oblong as shown, for example, in FIG. 5. The mirror 20, in FIGS. 1 to 3, is secured within a retainer 22 in the form of a flat stamping the rear surface 23 of which is provided with a pair of spaced brackets 24 and 26 extending at a right angle rearwardly therefrom and a central flange 28 likewise extending rearwardly therefrom parallel and intermediate the brackets 24, 26. The brackets 24, 26 and the intermediate flange 28 are provided with aligned apertures to receive a pivot pin 30. The mirror brackets 24, 26 and the flange 28 extend into an intermediate pivotal yoke member 32 in central position relative to a first pair of opposite arms 34, 36 of the yoke member 32, which are spaced a distance such as to abut outwardly against the opposite mirror brackets 24, 26, and which are likewise apertured to receive the ends of the pivot pin 30 for securement therein, so that the mirror 20 is pivotally retained within the opposite first pair of arms 34, 36 of the intermediate pivotal yoke member 32.

The intermediate pivotal yoke member 32 has a primary body portion 38 of a relatively thick cross section from which the first pair of opposite arms 34, 36 extend, and which is further provided with a second pair of opposite arms 40, 42 respectively, which extend in the same direction parallel to the first pair of arms 34, 36 but disposed at a 90° angle relative thereto. The ends of the second pair of arms 40, 42 are pivotally secured by means of pins 44 to the inside of an upper flange 46 and an oppositely spaced lower flange 48 of a stationary yoke member 50, the rear end 52 of which is secured to the inside of the closed rear end 12 of the mirror housing 10 by means of a fastener 54. Thus, the intermediate pivotal yoke member 32 is pivotally secured within the flanges 46, 48 of the stationary yoke member 50 for swivel movement around the pins 44, which are disposed along an axis "X" normal to the axis of the pivot pin 30 of the first mirror.

The rear end of the mirror flange 28 is formed into a first gear sector 56 which is adapted to mesh with a worm gear 58 secured to the end of an output drive shaft 60 of an electric motor 62 which is secured to the lower arm 42 of the intermediate pivotal yoke member 30 for extension through an elongated aperture 64 in the lower arm 48 of the stationary yoke member 50 in a direction downwardly towards the body panel 18. The electric motor 62 is connected by wires 63 to a suitable control (not shown) disposed within the vehicle for easy reach by the operator. The electric wires 63 extend through an appropriate aperture 17 in the base 16 and a correspondingly aligned aperture 19 in the panel 18 and from there into the interior of the vehicle. Thus, upon starting of the motor 62 the shaft 60 will be rotated in either direction as selected by the operator, to drive the worm gear 58 to thereby angularly move the mirror flange 28 around the pivot pin 30 due to the meshing engagement of the worm gear 58 with the gear sector 56 to thereby swing the mirror 20 in a vertical plane either up or down as indicated by the dotted line positions in FIG. 1. The upper tilting movement of the mirror 10 is limited by rearward abutment against the front edge 47 of the upper flange 46 of the stationary yoke member 50 and, similarly, downward tilting movement of the mirror 20 is limited by rearward abutment against the front edge 49 of the lower flange 48 of the stationary yoke member 50, as indicated by the dotted lines in FIG. 1

The rear surface of the body portion 48 of the intermediate pivotal yoke member 32 is provided with a second gear sector 66 disposed within a plane intersecting the plane in which the first gear sector is disposed at a right angle, that is, in a horizontal direction in the normal installation position of the mirror assembly 11, as shown in FIG. 1. With particular reference to FIG. 2, the second gear sector 66 is adapted to be in constant mesh with a worm gear 68 secured to an output drive shaft 70 of a second electric motor 72. As illustrated in FIG. 2, the second electric motor 72 is securely supported within the body portion 51 of the stationary yoke member 50 in a direction along an axis centrally between the upper and lower flanges 46, 48 and parallel to the first pair of arms 34, 36 of the intermediate pivotal yoke member 32. The second electric motor 72 is positioned at an angle relative to the central vertical plane of the mirror assembly 11 for tangential engagement of the worm gear with the second gear sector 66. Motor 72 is connected by appropriate wiring 74 extending through apertures 17, 19 into the vehicle to a suitable control mechanism (not shown) within the vehicle so that upon actuation of the second motor 72 by the operator of the vehicle, the worm gear 68 will be selectively rotated in either direction as chosen by the operator to thereby impart a pivoting movement of the mirror 20 around the pivot pin 44 due to the engagement of the worm gear 68 with the second gear sector 66 on the pivotal yoke member 32 towards the right or the left as dictated by conditions, and as indicated by the dotted line position of the mirror in FIG. 2. Thus, the worm gear 68 upon actuation pivotally rotates the intermediate pivotal yoke member 32 and thereby the mirror 20, due to the connection of the mirror with the pivotal yoke member 32 by means of the engagement of the worm gear 58 of the first gear sector 56 on the intermediate mirror flange 28. The respective limits of pivotal movement of the mirror 20 towards the left or to the right is established by the respective oppositely inclined front sides 76, 78 formed on the lower flange 48 of the stationary yoke member 50, as indicated by the dotted line positions of the mirror in FIG. 2.

Preferably, the motors 62 and 72 are of the same size and capacity, that is, they are of relatively small size to easily fit into the mirror housing 10 and the unique driving mechanism for universal tilting of the mirror is of simple construction by provision of a double yoke arrangement pivotally connected to the mirror along a pair of intersecting axis and each mechanism is operable independently of the other so that any angular mirror adjustment in one plane by actuation of one motor will not be affected by succeeding adjustment of the mirror in another plane by another motor. As clearly indicated in FIGS. 1 and 2, the first motor 62 is securely attached to the pivotal intermediate yoke 32 for movement therewith upon the adjustment of the mirror by the second motor 72. Angular pivotal movement of the motor 62 is provided for by the elongated aperture 64 in the lower flange 48 of the stationary yoke member 50 through which the first motor extends.

As particularly shown in FIGS. 2 and 3, the lower flange 48 of the stationary yoke member 50 is comprised of an elongated wing member extending substantially across the entire width of the internal transverse diameter of the mirror housing 10 and having oppositely outwardly extending wing portions 80 and 82.

The flat ends 84, 86 of the wing portions 80, 82 are retained in aligned relationship horizontally of the mirror assembly 11 within appropriate boss portions 88, 90 extending inwardly form the inner surface of the mirror housing 10 to thus securely support the stationary yoke member 50 within the mirror housing in alignment with the axial center of the mirror housing. The rear end of the stationary yoke member 50, as described previously, is secured to the inside of the closed rear end 12 of the mirror housing by a fastener 54 in alignment with the axial center of the housing. Thus, the mirror assembly and the associated dual drive mechanism are securely supported within the mirror housing 10 in such fashion as to be protected against shock loads caused by the running vehicle and so as to maintain the accuracy of the intersecting mirror adjusting axis relative to each other.

Figure 4:
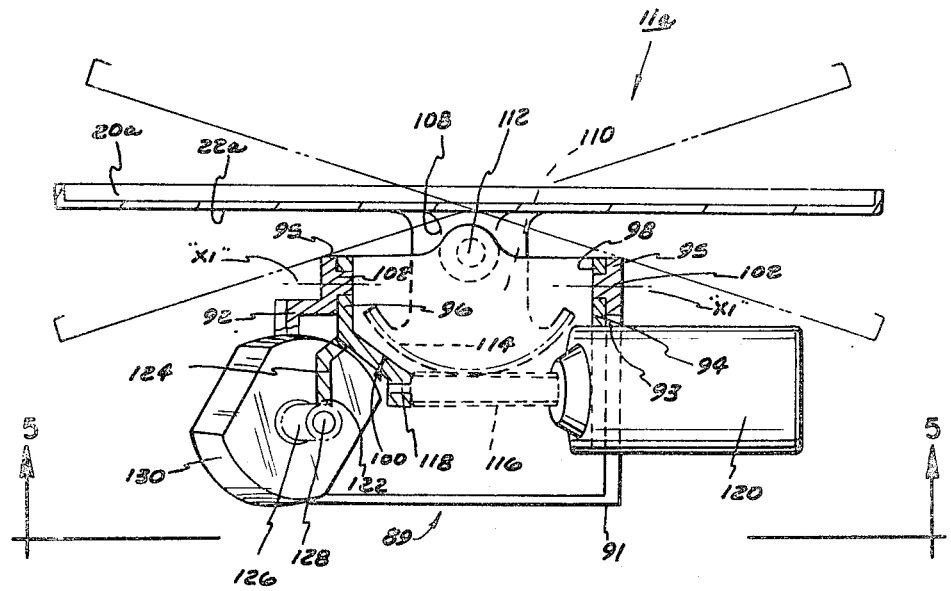
FIG. 4 illustrates a further modification of a mirror drive mechanism as seen from above, constructed in accordance with the present invention.

FIGS. 4 and 5 illustrate schematically a modified embodiment of a dual drive mechanism for an outside rearview mirror constructed in accordance with the present invention.

In this instance, an oblong mirror 20a is shown instead of the circular mirror 20 in FIGS. 1 to 3, although, as mentioned before, the shape of the mirror itself is immaterial.

The mirror assembly 11a and the associated pivotal support and dual drive mechanism 89 are retained conventionally in a housing (not shown) in a fashion similar to that illustrated in the mirror assembly 11 in FIGs. 1 to 3 for external mounting of the assembly to the vehicle body and for protection of the mirror mechanism. The particular shape of the housing for the mirror assembly 11a and drive mechanism 89 and its mode of attachment to the vehicle body is of no importance.

The pivotal support and dual drive mechanism 89 of the embodiment in FIGS. 4 and 5 comprises a stationary yoke member 91 having opposite flanges or arm sections 92, 94 respectively which are spaced a sufficient distance apart to receive the opposite arms 96, 98 of an intermediate pivotal yoke member 100 which at the front end is pivoted to the arms 92, 94 of the stationary yoke member 91 by means of pivot pins 102 disposed in coaxially aligned relationship, as seen in FIG. 4. Thus, the intermediate yoke member 100 is pivotally supported within the stationary yoke member 91 for tilting movement in angular direction relative to the stationary yoke member around the pivot pins 102.

The intermediate pivotal yoke member 100 has a flat top and bottom portion 104, 106 respectively connecting the arms 96, 98 so as to form a substantially open boxlike construction, as more clearly seen in FIG. 5. The top and bottom portions 104, 106 are further connected centrally by a strut member 108 positioned parallel to the arms 96, 98 and which is provided intermediate its ends with a flange portion 110 extending in a direction inwardly and outwardly of the intermediate yoke member to be secured outwardly by suitable means to the backing 22a of the mirror 20a which is likewise secured to the upper end and lower end of the strut member 108. The strut member 108 is rotatable within the intermediate yoke member around a pivot pin 112 disposed along an axis "X" disposed relative to the colinear axes "X1" of the pivot pins 102 at a right angle thereto in order to enable the mirror 20a to be swung towards the left or the right, as indicated by the dotted line positions of the mirror in FIG. 4. The swinging movement of the mirror is limited by abutment of the backing 22a of the mirror against either the left or right front edge 95 of the stationary yoke member 91, as indicated.

To enable power actuated swinging movement of the mirror 20a around the pivot pin 112, the rear end of the intermediate flange portion 110 of the strut member 108 is provided with a first gear sector 114 adapted to be in constant mesh with a worm gear 116, which is suitably secured for rotation to an output drive shaft 118, of a first motor 120, which is securely attached to one arm 98 of the intermediate pivotal yoke member 100 for pivotal rotation therewith, as will be explained. The first motor 120 extends through an opening 93 of one arm 94 of the stationary yoke member 91 to provide clearance for the motor upon pivotal movement of the intermediate yoke member 100. As is conventional practice, the first motor 120 is suitable connected by conduits (not shown) to a control device (not shown) positioned remote from the mirror assembly 11a within the vehicle, as previously described in connection with the embodiment in FIGS. 1 to 3, to enable remote actuation of the motor 120 for horizontal adjusting movement of the mirror 20a towards the left or the right as desired and depending on the selected direction of rotation of the motor output shaft 108.

To enable power actuated swinging movement of the mirror 20a in the other direction, that is, up or down around the pivot pins 102, the intermediate pivotal yoke member 100 is provided inwardly of the stationary yoke member 91 with a second gear sector 122 provided at the end of a flange 124 extending integrally from one arm 96 of the intermediate yoke member. The gear sector 122 is positioned in a plane normal to the plane in which the first gear sector 114 is positioned and is adapted to be in constant mesh with a worm gear 126 secured for rotation to an output drive shaft 128 of a second motor 130 which is secured to the rear end of the stationary yoke member 91 at one side thereof and in a position at right angle to the first motor 120. Similarly, as will be understood, the second motor 130 is suitably connected through electrical connections (not shown) to a control device (not shown) positioned remote from the mirror assembly 11a within the vehicle, as previously described in connection with the embodiments in FIGS. 1 to 3 to enable remote actuation of the second motor 130 for vertical up and down adjusting movement of the mirror 20a which is likewise limited in both extreme positions by abutment against the front edge 95 of the arm of the stationary yoke member 91. Thus, in this embodiment the mirror 20a is independently pivotal by separate remote power control means around the intersecting axes "X" and "X1."

Figure 6:
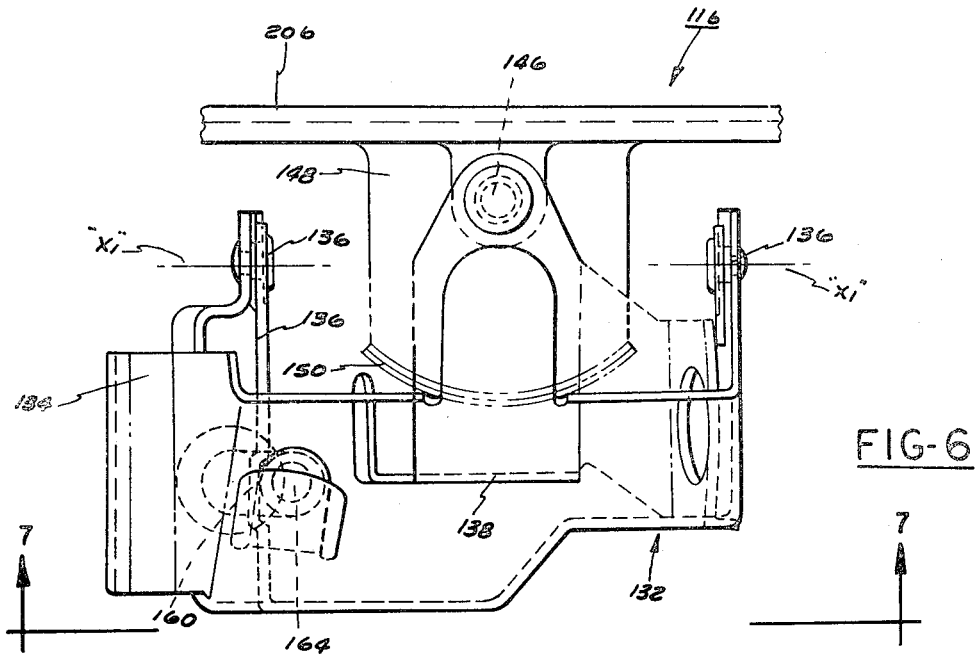
FIG. 6 is a top view of still another modification of a mirror drive mechanism constructed in accordance with the present invention.
Figure 7:
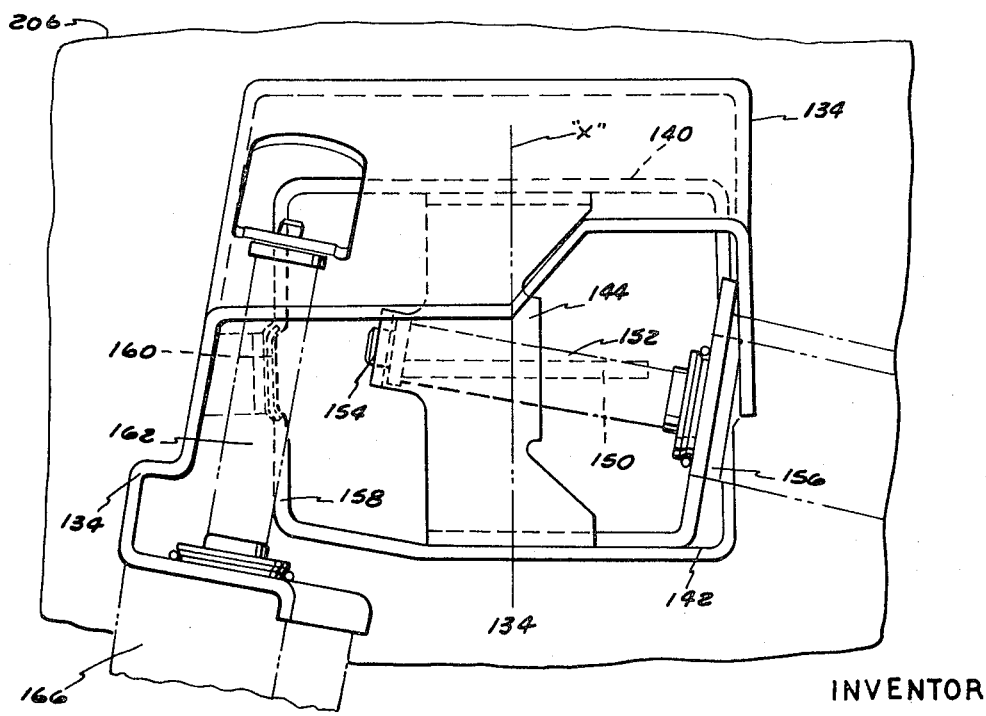
FIG. 7 is a rear view of the mirror drive mechanism shown in FIG. 6.

With reference now to FIGS. 6 and 7, there is illustrated a further structural modification of the present improved, universal, power operated mirror adjusting device in accordance with the present invention.

In this embodiment, the pivotal support and dual drive mechanism 132 for the mirror 20b is likewise preferably enclosed within a housing (not shown) of any suitable shape for outside attachment of the mirror assembly 11b to the body of the vehicle, as will be understood by reference to the illustration in FIG. 1.

The modification shown in FIGS. 6 and 7 is substantially identical to the structure shown in FIGS. 4 and 5 and includes a stationary yoke member 134 within which is pivotally supported by means of pins 136 an intermediate pivotal yoke member 138 which is provided with a top and bottom portions 140, 142 centrally connected by a strut member 144 and through which a pivot shaft 146 extends which is secured to the top and bottom portion. The strut member 144 is connected by an intermediate flange 148 to the mirror 20b and is provided at its inner end within the intermediate yoke member 138 with a first gear sector 150, which is adapted to be in constant mesh with a worm gear 152 secured to an output drive shaft 154 of a first motor 156 rigidly supported on the intermediate yoke member 138. As before, the first motor is connected to a suitable control (not shown) within the vehicle for remote actuation of the motor to pivot the mirror 20b around a vertical axis "X" towards the right or left.

The intermediate pivotal yoke member 138 is provided at one side flange 158 thereof with a second gear sector 160 disposed in a plane normal to the plane in which the first gear sector 150 is disposed. The second gear sector 160 is adapted to be in constant mesh with a worm gear 162 securely attached for rotation by the output drive shaft 164 of a second motor 166, which is supported at the rear of the stationary yoke member 134 at one side thereof and in a position at a right angle to the first motor. Similarly, as will be understood, the second motor 166 is connected to a suitable control (not shown) within the vehicle for remote actuation of the second motor independently of the first motor to pivot the mirror 20b around a horizontal axis "X1" intersecting axis "X" at a right angle thereto.

From the foregoing, ti will be evident that the present invention provides an improved, universal, power operated, adjustable rear view mirror by means of a unique double yoke construction, each of the yokes carrying an independently operated drive mechanism to independently adjust the mirror around axes intersecting each other.

Having thus described my invention I claim:

1. A power actuated outside rearview mirror assembly comprising:

a mirror retained within a backing member;

a housing having a closed end and an open end, said mirror extending across said open end;

support means integral with said backing member and extending rearwardly therefrom, within said housing, the support means being adapted to extend within a first pair of spaced arms of a first yoke member for pivotal connection thereto;

said first yoke member unconnected to said housing extending within a second yoke member connected to said housing and having a second pair of spaced arms for pivotal connection to said yoke member;

first driving means including a first gear section provided on said support means, a drive gear adapted to mesh with said first gear sector and a first electric motor means, supported on said first yoke member for movement therewith, to rotate said drive gear to rotate said mirror by angular rotation of said first gear sector, around a first axis, and second driving means including a second gear sector provided on said first yoke member, a drive gear adapted to mesh with said second gear sector and a second electric motor means, rigidly supported on said second yoke member, to rotate said drive gear to rotate said mirror around a axis positioned normal to said first axis and independently of the rotation of said mirror around said first axis by said drive gear angularly rotating said second gear sector around said second axis.

2. The assembly as defined in claim 1, and in which said first axis comprises a pivot pin connecting said mirror support means with said first pair of spaced arms of said first yoke member and said second axis comprises a pair of coaxially aligned pivot pins connecting the second pair of spaced arms of said first yoke member with said second yoke member.

3. The assembly as defined in claim 1, and in which said first and said second driving means are adapted for remote control.

4. The assembly as defined in claim 1, and including said second yoke member being stationarily supported within said housing and comprising a rear body portion adjacent said closed end of said housing for securement thereto, winglike arm portion intermediate said housing extending transverse thereof, said winglike arm portion having outer ends adapted to be received within a pair of opposite boss portions extending inwardly from said housing for support thereby in accurate aligned position to maintain said first and said second axes within planes intersecting each other at a right angle centrally of said housing.

5. The assembly as defined in claim 4, and in which said winglike arm portion of said second yoke member is provided with an elongated aperture for the extension of said first motor means therethrough for angular movement of said first motor means within said aperture.

6. In a multiple drive mechanism for a power actuated adjustable rearview mirror, a mirror assembly enclosed within a housing, means pivotally mounting said mirror assembly to a first of said multiple mechanism, said first drive mechanism comprising flange means, extending from said mirror rearwardly, provided with a first sector gear adapted for meshing engagement with a drive gear, said drive gear being driven by a first motor means for rotation of said mirror assembly around a first axis, said first multiple drive mechanism unconnected to said housing, means drivingly connecting said pivoted mounting means to a second of said multiple drive mechanism, connected to said housing for rotation of said mirror assembly around a second axis positioned normal to said first axis which includes a pivoted first yoke, supporting said first motor means and mounted for swinging movement around said second axis within a stationary member, said stationary member comprising a second yoke pivotally supporting said first yoke, said first yoke being provided with a second sector gear positioned in a plane normal to the plane in which said first sector gear is positioned, said second sector gear being adapted for meshing engagement with a drive gear, said drive gear being driven by second motor means mounted on said stationary member to angularly rotate said first yoke around said second axis.

* * * * *